United States Patent [19]

Horn et al.

[11] Patent Number: 5,326,800

[45] Date of Patent: Jul. 5, 1994

[54] USE OF SALTS IN COMBINATION WITH HALOGENATED PHTHALIMIDES FOR FLAMEPROOF FINISHING OF GLASS FIBRE-CONTAINING POLYCARBONATE MOULDED MEMBERS

[75] Inventors: Klaus Horn, Krefeld; Jürgen Kirsch; Richard Weider, both of Leverkusen; Hugo Obermann, Dormagen; Dieter Freitag; Karsten-Josef Idel, both of Krefeld, all of Fed. Rep. of Germany

[73] Assignee: Bayer Aktiengesellschaft, Leverkusen, Fed. Rep. of Germany

[21] Appl. No.: 29,865

[22] Filed: Mar. 11, 1993

[30] Foreign Application Priority Data

Mar. 18, 1992 [DE] Fed. Rep. of Germany ....... 4208643
Jul. 1, 1992 [DE] Fed. Rep. of Germany ....... 4221581

[51] Int. Cl.$^5$ .................. C08K 5/3417; C08K 5/42; C08K 5/5317
[52] U.S. Cl. ...................... 524/94; 524/130; 524/145; 524/160; 524/161; 524/162; 524/163; 524/164; 524/165; 524/166; 524/394; 521/40
[58] Field of Search ............... 524/94, 130, 160–166, 524/394, 145; 521/40

[56] References Cited

U.S. PATENT DOCUMENTS

| 3,845,007 | 10/1974 | Nouvertne et al. | 260/37 PC |
|---|---|---|---|
| 3,875,107 | 4/1975 | Nouvertne et al. | 260/37 PC |
| 3,926,908 | 12/1975 | Mark | 524/160 |
| 3,940,366 | 2/1976 | Mark | 524/164 |
| 3,953,399 | 4/1976 | Mark | 524/164 |
| 4,039,509 | 8/1977 | Mark et al. | 524/94 |
| 4,104,246 | 8/1978 | Mark | 524/163 |
| 4,110,299 | 8/1978 | Mark | 260/37 PC |
| 4,208,489 | 6/1980 | Schmidt et al. | 524/94 |
| 4,268,429 | 5/1981 | Webb et al. | 260/37 PC |
| 4,366,276 | 12/1982 | Freitag et al. | 524/130 |
| 4,444,930 | 4/1984 | Guerin et al. | 524/130 |
| 4,552,911 | 11/1985 | Cohnen et al. | 524/94 |
| 4,581,396 | 4/1986 | Sonnenberg | 524/87 |
| 4,657,955 | 4/1987 | Kress et al. | 524/130 |
| 4,710,531 | 12/1987 | Dozzi et al. | 524/94 |
| 4,751,260 | 6/1988 | Kress et al. | 524/130 |
| 4,757,103 | 7/1988 | Dozzi et al. | 524/394 |
| 4,786,671 | 11/1988 | Kress et al. | 524/94 |
| 4,972,011 | 11/1990 | Richardson et al. | 524/130 |
| 5,030,675 | 7/1991 | Wittmann et al. | 524/130 |
| 5,049,601 | 9/1991 | Khuddus | 524/94 |
| 5,109,045 | 4/1992 | Price et al. | 524/94 |
| 5,120,778 | 6/1992 | Price et al. | 524/94 |
| 5,124,377 | 6/1992 | Price et al. | 524/94 |
| 5,130,365 | 7/1992 | Kaishi et al. | 524/94 |

FOREIGN PATENT DOCUMENTS 2703710 8/1978 Fed. Rep. of Germany .
2918882 11/1980 Fed. Rep. of Germany .
50-119041 9/1975 Japan .

OTHER PUBLICATIONS

Database WPI,Wk 9041, Derwent Publications Ltd., London, GB; AN 90-309091 & JP-A-2 218 745 (Idemitsu Petrochem KK) Aug. 31, 1990.

Primary Examiner—Kriellion S. Morgan
Attorney, Agent, or Firm—Joseph C. Gil; Aron Preis

[57] ABSTRACT

The invention relates to use of salts of sulphonic acids, phosphonic acids and/or carboxylic acids in combination with halogenated phthalimides for additional processing of glass fibre-containing polycarbonate moulded members.

7 Claims, No Drawings

USE OF SALTS IN COMBINATION WITH HALOGENATED PHTHALIMIDES FOR FLAMEPROOF FINISHING OF GLASS FIBRE-CONTAINING POLYCARBONATE MOULDED MEMBERS

The invention relates to use of salts of sulphonic acids, phosphonic acids and/or carboxylic acids in combinations with halogenated phthalimides for additional processing of glass fibre-containing polycarbonate moulded members, particular preference being given to use of salts of sulphonic acids in combination with halogenated phthalimides.

According to Underwriters' Laboratories Inc., Bulletin 94, Combustion Tests for Classification of Materials (hereinafter called UL 94), glass fibre-reinforced polycarbonate test pieces measuring 127×12×3.2 mm (1.8") and 127×12×1.6 mm (1/16") are not given fire classification V-0, but only V-1 or V-2.

A V-0 for 3.2 and 1.6 mm in the UL 94 test is obtained only after adding flame retardants, based e.g. on suitable aromatic or aliphatic sulphonic acid salts or other suitable organic salts.

The effect of aromatic sulphonic acid salts as flame-retarding additives for polycarbonates is described e.g. in U.S. Pat. No. 3,933,734 or U.S. Pat. No. 3,940,366. The addition of sulphonic acid salts of aromatic carboxylic acids, carboxylic acid esters and ketones to polycarbonates has also been described (see e.g. U.S. Pat. No. 3,953,399; U.S. Pat. No. 3,926,908; U.S. Pat. No. 4,104,246).

For economic reasons it is desirable to shred sprues and faulty injection-moulded parts and add them to the initial product and return them to the injection-moulding process (processing of regenerated material).

The disadvantage of this procedure, however, is that glass fibre-reinforced polycarbonates flame-proofed with sulphonic acid salts are not guaranteed to reach a V-0 in the UL 94 test if mixed with regenerated material. Even if only 20% by weight is added, a score of V-0 is not reached.

Similar remarks apply to glass fibre-reinforced polycarbonate moulded members which have been given a flame-resistant finish with salts of phosphonic acids or carboxylic acids.

It is therefore surprising that as a result of additional use of halogenated phthalimides, preferably those having the formula (I) and/or (II), particularly preferably those having the formula (II):

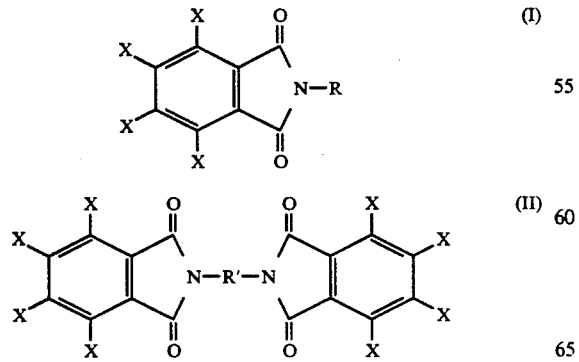

in which
X=Cl, Br

R=$C_1$-$C_4$ alkyl, $C_6H_5$, $C_{10}H_7$, $C_6H_9X$, $C_6H_3X_2$ or $C_6H_2X_3$ where X=fluorine, chlorine or bromine and where R'=a single bond or $C_2$-$C_8$ alkylene, $C_6H_4$ or p-diphenylene, preferably $C_6$ alkylene, glass fibre-containing polycarbonates containing 0.01 to 5.0, more particularly 0.03 to 0.5% by weight of the aforementioned sulphonic acid salts and/or phosphonic acid salts and/or carboxylic acid salts retain a V-0 at a thickness of 1.6 mm to UL 94 or even a V-0 at 1.2 mm, even after repeated processing (with regenerated material). The percentages by weight all refer to the weight of polycarbonate without the addition of glass fibre.

The amount of halogenated phthalimides required is 0.005 to 3.0, preferably 0.1 to 1.0% by weight, in each case relative to the weight of polycarbonate without added glass fibre.

The invention can thus be used to manufacture flame-resistant, glass fibre-reinforced polycarbonate resins by re-use of glass fibre-containing polycarbonate moulded members or, in other words, to convert glass fibre-containing moulded members, e.g. in the form of waste or scrap injection-moulded particles, into flame-resistant (V-0 at 1.6 mm) glass fibre-containing polycarbonate resins which in turn can be converted into flame-resistant polycarbonate moulded members.

According to the invention, flame-resistant glass-fibre containing polycarbonate resins, preferably containing 7 to 45, more particularly 10 to 20% by weight of glass fibres, in each case relative to the weight of polycarbonate resin, are preferably manufactured in the following three ways:

1. by shredding glass fibre-containing polycarbonate moulded members and then processing them with the suitable salts according to the invention of sulphonic acids, phosphonic acids and/or carboxylic acids and with the suitable halogenated phthalimides according to the invention and optionally with polycarbonate resin and/or glass fibres together in known manner via the melt to obtain glass fibre containing flame-resistant polycarbonate resin or 2. by shredding glass fibre-containing polycarbonate moulded members which already contain incorporated suitable salts according to the invention of sulphonic acids, phosphonic acids and/or carboxylic acids and then processing them with the suitable halogenated phthalimides according to the invention and optionally with polycarbonate resin and/or glass fibres together in known manner via the melt to obtain glass fibre-containing flame-resistant polycarbonate resin or, 3. shredding glass fibre-containing polycarbonate moulded members which already contain incorporated suitable salts according to the invention of sulphonic acids, phosphonic acids and/or carboxylic acids and the suitable halogenated phthalimides according to the invention and then processing them optionally with polycarbonate resin and/or glass fibres together in known manner via the melt to obtain glass fibre-containing flame-resistant polycarbonate resin.

In all three cases, processing via the melt is carried out in an extruder or an injection-moulding machine.

The invention therefore also relates to a method of preparing flame resistant, glass fibre-containing polycarbonate resins from glass fibre-containing polycarbonate moulded members, characterised in that either glass fibre-containing polycarbonate moulded members are shredded and then processed with suitable salts according to the invention of sulphonic acids, phosphonic acids and/or carboxylic acids and with halogenated phthalimides and optionally with polycarbonate resin and/or glass fibres together in known manner via the melt to obtain glass fibre-containing flame-resistant polycarbonate resin, or glass fibre-containing polycarbonate moulded members already containing incorporated suitable salts according to the invention of sulphonic acids, phosphonic acids and/or carboxylic acids are shredded and then processed with halogenated phthalimides and optionally with polycarbonate resin and/or glass fibres together in known manner via the melt to obtain glass fibre-containing flame-resistant polycarbonate resin, or glass fibre-containing polycarbonate moulded members already containing incorporated suitable salts according to the invention of sulphonic acids, phosphonic acids and/or carboxylic acids and halogenated phthalimides are shredded and then optionally processed with polycarbonate resin and/or glass fibres together in known manner via the melt to obtain glass fibre-containing flame-resistant polycarbonate resin.

Polycarbonate resins in the sense of the present invention are aromatic homopolycarbonates or copolycarbonates based on diphenols, particularly dihydroxydiaryl alkanes or cycloalkanes, already obtainable with phosgene or diesters of carboxylic acid, and the suitable substances, in addition to unsubstituted dihydroxy diaryl alkanes or cycloalkanes, also include substances having aryl radicals containing methyl groups or halogen atoms in the o- and/or m-position relative to the hydroxyl group. Both straight-chain and branched polycarbonates are suitable.

The polycarbonate resins have weight average molecular weights Mw between 10,000 and 100,000, preferably between 20,000 and 40,000, determined by measurement of the relative viscosity in $CH_2Cl_2$ at 25° C. and at a concentration of 0.5 g per 100 ml.

The following are examples of suitable diphenols: hydroquinone, resorcinol, 4,4'-dihydroxydiphenyl, bis-(hydroxyphenyl) alkanes such as $C_1-C_8$ alkylene or $C_2-C_8$ alkylidene bisphenols, bis-(hydroxyphenyl)-cycloalkanes such as $C_5-C_{15}$ cycloalkylene or $C_5-C_{15}$ cycloalkylidene bisphenols, bis-(hydroxyphenyl) sulphides, ethers, ketones, sulphoxides or sulphones, also α, α' bis-(hydroxyphenyl)-diisopropyl benzene or the corresponding alkylated-ring or halogenated-ring compounds.

The chains can be broken by phenols, preferably $C_1-C_{10}$ alkyl phenols, particularly branched $C_8-C_9$ alkyl phenols.

Preference is given to polycarbonates based on bis-(4-hydroxyphenyl) propane-2,2 (bisphenol A), bis-(4-hydroxy-3,5-dichlorophenyl)-propane-2,2 (tetrachlorobisphenol A), bis-(4-hydroxy-3,5-dibromophenyl)-propane-2,2 (tetrabromobisphenol A), bis-(4-hydroxy-3,5-dimethyl-phenyl)-propane 2,2 (tetramethyl bisphenol A), bis-(4-hydroxyphenyl)-cyclohexane-1,1 (bisphenol Z), bis-(4-hydroxyphenyl)-3,3,5-trimethylcyclohexane-1,1 or polycarbonates based on three-ring bisphenols such as α,α'- bis-(4-hydroxyphenyl)-p-diisopropyl benzene.

Other suitable diphenols for producing polycarbonates are described in U.S. Pat. Nos. 2,970,131, 2,991,273, 2,999,835, 2,999,846, 3,028,365, 3,062,781, 3,148,172, 3,271,367, 3,275,601 and 4,982,014.

Polycarbonate resins occur in the form of granulates, powder, solid solutions or friable material and can be used in this form according to the invention.

Polycarbonate moulded members are articles made from polycarbonate resins by any process of shaping, e.g. by injection moulding or extrusion.

U.S. Pat. No. 4,581,396 (Raychem, Corp.) discloses plastics containing halogenated bisimides and optionally other flame retardants.

The flame retardants may also be compounds in the fifth group of the periodic system of the elements. Polycarbonate plastics are not mentioned in the U.S. patent.

DE-OS 2 148 598 (Le A 13 970) (U.S. Pat. No. 3,845,007) discloses flame-proof thermoplastic moulded materials and moulded members comprising halogen-containing polycarbonate, salts of alkali or nickel metals and glass fibres in proportions of 2 to 6% by weight. The re-use and processing of these moulded members is not mentioned in the DE-OS.

JA 75-119 041 discloses polycarbonates containing 1 to 50% of halogenated phthalimides, other flame retardants and glass fibres. The subject of reprocessing is not discussed in this citation, in the English translation available to us.

DE-OS 26 31 756 discloses polycarbonates which are made flame-resistant by adding halogenated organic compounds and alkali-metal salts of inorganic sulphur compounds. Glass fibres can also be used. The subject of recycling is not discussed in this citation either.

DE-OS 27 44 016 and U.S. Pat. No. 4,110,299 disclose polycarbonates containing organic alkali metal salts and organic halides (claim 1). Glass fibres can also be added (claim 15). The subject of recycling is not discussed in this citation either.

DE-OS 27 03 710 (Le A 17 759) (U.S. Pat. No. 4,208,489) discloses polycarbonates with alkali salts of organic acids and halogenated phthalimides. There is no mention of addition of glass fibres or of re-use or reprocessing of flame-resistant polycarbonates in this DE-OS.

DE-OS 29 18 882 (Le A 19 568) discloses flame-resistant polycarbonate moulded materials containing organic halogen compounds, alkali-metal salts of organic acids and anti-dripping agents. The organic halogen compounds can also be tetrahalogen phthalimides. The alkali-metal salts can be of sulphonic acids, phosphonic acids or carboxylic acids, and the anti-dripping agents can also be glass fibres. Reprocessing is not mentioned in this DE-OS. The same applies to the teaching in DE-OS 29 18 883 (Le A 19 569).

EP-0 086 353 (Le A 21 535) (U.S. Pat. No. 4,552,911) discloses flame-resistant polycarbonate moulded materials containing alkali-metal salts of organic acids, halogenated phthalimides and glass fibres. The polycarbonates are branched and the alkali-metal salts of organic acids can be of sulphonic acids or carboxylic acids; also the moulded materials must contain 0.1 to 7% by weight of bromine, either in the form of monomers incorporated in the polycarbonate by condensation or in the form of admixed low-molecular bromine compounds. The subject of recycling of polycarbonate moulded members is not discussed in EP-0 086 353 either.

Accordingly the subject of the present invention is not known or anticipated by the prior art.

The salts of sulphonic acids, phosphonic acids and carboxylic acids are the alkali-metal salts, alkaline earth metal salts and ammonium salts, preferably the alkali-metal salts and particularly the Li, Na and K salts.

The salts may e.g. be the salts known in the art, and identified as flame retardants for polycarbonates, of sulphonic acids, phosphonic acids and carboxylic acids, e.g. sodium or potassium perfluorobutane sulphonate, sodium or potassium perfluorooctane sulphonate, sodium or potassium methyl phosphonate or sodium or diphenyl sulphone sulphonate-Na or -K.

The following are examples of suitable tetrachlorophthalimides in the sense of the invention as per formula I:
N-methyl-tetrachlorophthalimide
N-ethyl-tetrachlorophthalimide
N-propyl-tetrachlorophthalimide
N-isopropyl-tetrachlorophthalimide
N-butyl-tetrachlorophthalimide
N-isobutyl-tetrachlorophthalimide
N-phenyl-tetrachlorophthalimide.

The following are examples of suitable tetrachlorophthalimides in the sense of the invention as per formula II:
N,N'-ethylene-di-tetrachlorophthalimide
N,N'-propylene-di-tetrachlorophthalimide
N,N'-butylene-di-tetrachlorophthalimide
N,N'-hexylene-di-tetrachlorophthalimide
N,N'-p-phenylene-di-tetrachlorophthalimide.

N,N'-hexylene ditetrachlorophthalimide and N,N'-ethylene ditetrachlorophthalimide are particularly suitable according to the invention.

The glass fibres according to the invention may be of any commercially obtainable grade or type, e.g. cut (long glass fibres=chopped strands) or short glass (=milled fibres) provided they are finished by suitable sizing so as to be compatible with polycarbonate. The glass fibres used for producing the moulded materials are made from E-glass. E-glass is defined as per DIN 1259, as an aluminium-boron silicate glass containing less than 1% by weight of alkali-metal oxide. Normally use is made of glass fibres having a diameter of 8 to 20 μm and a length of 3 to 6 mm (chopped strands). Use can also be made of short glass (milled fibres) or suitable glass balls.

The flame-resistant, glass fibre-containing polycarbonate resins obtainable by the method according to the invention are also suitable for manufacturing flame-resistant polycarbonate moulded members, i.e. by extrusion or injection moulding. The moulded members can e.g. be foils, plates, hollow-chamber plates, lamps or casings for electrical appliances or the like.

Conventional additives such as stabilisers against H2O, heat and UV radiation, pigments, fillers and mould-release agents can be incorporated in known manner and in known quantities in the flame-resistant glass fibre-containing polycarbonate resins obtainable according to the invention, before or during conversion to polycarbonate moulded members.

The flame-resistant polycarbonate moulded members manufactured from the polycarbonate resins obtainable according to the invention are of use e.g. in the electric sector, for computer casings, in the lighting sector or in the car sector.

EXAMPLES

EXAMPLE 1

5 kg of moulded members comprising 10% by weight of glass fibre-reinforced polycarbonate (not containing flame-retarding salts and/or halogen containing phthalimides) were shredded and then mixed with 0.15% by weight of potassium perfluorobutane sulphonate and 0.5% by weight of hexamethylene bistetrachlorophthalimide.

The mixture was then converted by injection-moulding at 280° C. into test-pieces measuring 127×12.7×1.6 mm.

The test rods were then given a combustibility test to specification UL 94 (combustibility of solid plastics test-pieces, Underwriter Laboratories). The material was put in combustibility class VO.

COMPARATIVE EXAMPLE 1

The procedure was as in Example 1 but without adding 0.15% by weight of potassium perfluorobutane sulphonate and 0.5% by weight of hexamethylene bistetrachlorophthalimide. The material was put in combustibility class V2.

EXAMPLE 2

5 kg of moulded members comprising 10% by weight of glass fibre-reinforced polycarbonate and flame-proofed with 0.15% by weight of potassium perfluorobutane sulphonate (i.e. VO in 1.6 mm) (not containing halogen-containing phthalimides) were shredded and mixed with 0.5% by weight of hexamethylene bistetrachlorophthalimide.

The mixture was then injection-moulded at 280° C. to form test-pieces measuring 127×12.7×1.6 mm.

The test rods were then subjected to a combustibility test as per specification UL 94 (combustibility of solid plastics test-pieces, Underwriter Laboratories). The material was put in combustibility class VO.

COMPARATIVE EXAMPLE 2

The procedure was as in Example 2 but without adding 0.5% by weight of hexamethylene bistetrachlorophthalimide. The material was put in combustibility class V2.

EXAMPLE 3

A bisphenol-A polycarbonate having a viscosity of Eta Rel=1.305 was melted at temperatures of 300°-320° C. in a double-shaft extruder, followed by metered addition of a mixture of chopped strands, 0.5% by weight of mould-release agent, 0.15% by weight of potassium perfluorobutane sulphonate and 0.30% by weight of hexamethylene bistetrachlorophthalimide directly into the polycarbonate melt.

The polymer strand was cooled and granulated.

The granulate was dried (in a vacuum drying cupboard) and then injection-moulded at 280° C. to form test-pieces measuring 127×12.7×1.6 mm.

The test rods were then subjected to a combustibility test to specification UL 94 (combustibility of solid plastics test-pieces, Underwriter Laboratories) and put in combustibility class VO.

EXAMPLE 4

5 kg of moulded members consisting of the compound in Example 3 were shredded.

10% by weight of the shredded material was mixed with the compound in Example 3.

The mixture was then injection-moulded at 280° C. to obtain test-pieces measuring 127×12.7×1.6 mm and 127×12.7×1.2 mm.

The test rods were then subjected to a combustibility test to specification UL 94 (combustibility of solid plastics test-pieces, Underwriter Laboratories). The material was put in combustibility class VO in 1.6 and 1.2 mm.

EXAMPLE 5

5 kg of moulded members from Example 4 were shredded. 20% by weight of the shredded material was added to the compound in Example 3.

The mixture was then injection-moulded at 280° C. to obtain test-pieces measuring 127×12.7×1.6 mm and 127×12.7×1.2 mm.

The test rods were then given a combustibility test to specification UL 94 (combustibility of solid plastics test-pieces, Underwriter Laboratories). The material was put in combustibility class VO in 1.6 and 1.2 mm.

EXAMPLE 6

5 kg of moulded members consisting of the compound in Example 3 were shredded.

The mixture was then injection-moulded at 280° C. to obtain test-pieces measuring 127×12.7×1.6 mm.

The test-rods were then given a combustibility test to specification UL 94 (combustibility of solid plastics test-pieces, Underwriter Laboratories). The material was put in combustibility class VO.

EXAMPLE 7

5 kg of moulded members comprising 10% by weight of glass fibre-reinforced polycarbonate (not containing flame-retarding salts and/or halogen-containing phthalimides) were shredded, followed by addition of 0.10% by weight of potassium methyl phosphonate and 0.5% by weight of hexamethylene bis-tetrachlorophthalimide.

The mixture was then injection-moulded at 280° C. to obtain test-pieces measuring 127×12.7×1.6 mm.

The test rods were then subjected to a combustibility test to specification UL 94 (combustibility of solid plastics test-pieces, Underwriter Laboratories). The material was put in combustibility class VO.

COMPARATIVE EXAMPLE 3

The procedure was as in Example 7 but without adding 0.10% by weight of potassium methyl phosphonate or 0.5% by weight of hexamethylene bis-tetrachlorophthalimide. The material was put in combustibility class V2.

We claim:

1. A method of preparing flame-resistant, glass fibre-containing polycarbonate resins from glass fibre-containing polycarbonate moulded members, characterised in that
   either glass fibre-containing polycarbonate moulded members are shredded and then processed with salts of sulphonic acids, phosphonic acids and/or carboxylic acids and with halogenated phthalimides and optionally with polycarbonate resin and/or glass fibres together in known manner via the melt to obtain glass fibre-containing flame-resistant polycarbonate resin,
   or glass fibre-containing polycarbonate moulded members already containing incorporated salts of sulphonic acids, phosphonic acids and/or carboxylic acids are shredded and then processed with halogenated phthalimides and optionally with polycarbonate resin and/or glass fibres together in known manner via the melt to obtain glass fibre-containing flame-resistant polycarbonate resin,
   or glass fibre-containing polycarbonate moulded members already containing incorporated salts of sulphonic acids, phosphonic acids and/or carboxylic acids and halogenated phthalimides are shredded and then optionally processed with polycarbonate resin and/or glass fibres together in known manner via the melt to obtain glass fibre-containing flame-resistant polycarbonate resin.

2. A method of preparing flame-resistant, glass fiber containing polycarbonate composition from recycled glass fiber-containing polycarbonate molded members comprising
   (i) shredding glass fiber-containing polycarbonate molded members to produce shredded material, and
   (ii) adding to said shredded material in the molten state
   (a) at least one salt selected from the group consisting of alkali-metal, alkaline earth metal and ammonium salts of an acid selected from the group consisting of sulphonic acid, phosphonic acid and carboxylic acid and
   (b) a halogenated phthalimide,
   in sufficient amounts to render the composition flame retardance of V-0 for specimens having a thickness of 1.6 mm in accordance with UL-94.

3. The method of claim 2 wherein said a) is potassium perfluorobutane sulfonate.

4. The method of claim 2 wherein said a) is potassium methyl phosphonate.

5. The method of claim 2 wherein said b) is hexamethylene bistetrachloro-phthalimide.

6. The method of claim 3 wherein said b) is hexamethylene bistetrachloro-phthalimide.

7. The method of claim 4 wherein said b) is hexamethylene bistetrachloro-phthalimide.

* * * * *